US007423858B2

(12) United States Patent
Dobbs et al.

(10) Patent No.: US 7,423,858 B2
(45) Date of Patent: Sep. 9, 2008

(54) APPARATUS COMPRISING CIRCUIT BREAKER WITH ADJUNCT SENSOR UNIT

(75) Inventors: Eugene F. Dobbs, Cambridge, MD (US); Mervyn B. Johnston, Easton, MD (US); Noel Keith Ware, Dagsboro, DE (US)

(73) Assignee: Airpax Corporation, Cambridge, MD (US)

( * ) Notice: Subject to any disclaimer, the term of this patent is extended or adjusted under 35 U.S.C. 154(b) by 0 days.

(21) Appl. No.: 11/360,188

(22) Filed: Feb. 21, 2006

(65) Prior Publication Data

US 2007/0053127 A1 Mar. 8, 2007

Related U.S. Application Data

(60) Provisional application No. 60/654,074, filed on Feb. 18, 2005.

(51) Int. Cl.
*H02H 3/08* (2006.01)

(52) U.S. Cl. .................................................... 361/93.1

(58) Field of Classification Search ................. 361/93.1
See application file for complete search history.

(56) References Cited

U.S. PATENT DOCUMENTS 4,281,359 A 7/1981 Bayer et al. ................. 361/115
4,425,596 A 1/1984 Satou
4,661,807 A 4/1987 Panaro ....................... 340/638
5,416,407 A 5/1995 Drafts ........................ 324/117
5,615,075 A * 3/1997 Kim ............................ 361/87
5,923,514 A 7/1999 Scott et al. ..................... 361/93
6,034,859 A 3/2000 Baumgärtl ................. 361/93.6
6,040,688 A 3/2000 Strūbin ....................... 323/368
6,064,289 A 5/2000 Wieloch et al.
6,108,185 A * 8/2000 Kim et al. ................... 361/115
6,121,862 A * 9/2000 von Eckroth et al. ........... 335/6
6,144,229 A 11/2000 Blossfeld ..................... 327/50
6,433,981 B1 8/2002 Fletcher et al. ............ 361/93.1
6,442,011 B1 8/2002 Attarian et al. ............ 361/93.1
6,456,061 B1 9/2002 Criniti et al. ................ 324/127
6,472,878 B1 10/2002 Bruchmann ................. 324/424
6,570,373 B1 * 5/2003 Viola ......................... 324/130
6,608,481 B1 8/2003 Piazza et al. ................ 324/424
6,661,632 B2 12/2003 Bilac et al. ................. 361/93.2

(Continued)

FOREIGN PATENT DOCUMENTS

DE 10253018 A1 5/2004

(Continued)

OTHER PUBLICATIONS

Robert L. Boylestad and Louis Nashelsky, Electronic Devices and Circuit Theory, Prentice Hall, 8th Edition, p. 786.*

*Primary Examiner*—Michael J Sherry
*Assistant Examiner*—Lucy Thomas
(74) *Attorney, Agent, or Firm*—Miles & Stockbridge P.C.

(57) ABSTRACT

A self-contained current sensor unit is integrated with a standard circuit breaker as an attachment to the circuit breaker that requires minimal modification of the circuit breaker and that becomes an extension of the case of the circuit breaker. The current sensor unit includes a magnetic structure with a programmable Hall Effect device and may include a power supply, a Hall Effect voltage regulator, and an output signal conditioner.

14 Claims, 9 Drawing Sheets

U.S. PATENT DOCUMENTS

| | | | | |
|---|---|---|---|---|
| 6,750,644 | B1 * | 6/2004 | Berkcan | 324/117 R |
| 6,754,059 | B2 | 6/2004 | Bach et al. | 361/93.1 |
| 6,781,359 | B2 * | 8/2004 | Stauth et al. | 324/117 H |
| 6,798,250 | B1 | 9/2004 | Wile | 327/51 |
| 2002/0145416 | A1 | 10/2002 | Attarian et al. | 324/127 |
| 2003/0001702 | A1 | 1/2003 | Bach et al. | 335/9 |
| 2005/0013077 | A1 | 1/2005 | Gemme et al. | 361/93.1 |

FOREIGN PATENT DOCUMENTS

| | | | |
|---|---|---|---|
| EP | 0538658 | A1 | 4/1993 |
| EP | 1107274 | A1 | 6/2001 |
| WO | WO 01/78099 | A1 | 10/2001 |
| WO | WO 03/056594 | A1 | 7/2003 |

* cited by examiner

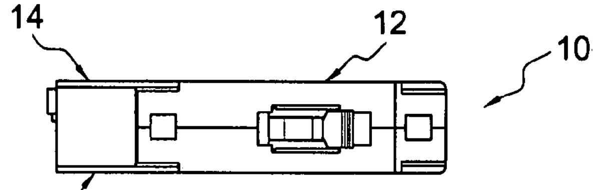
FIG. 1A
FIG. 1C
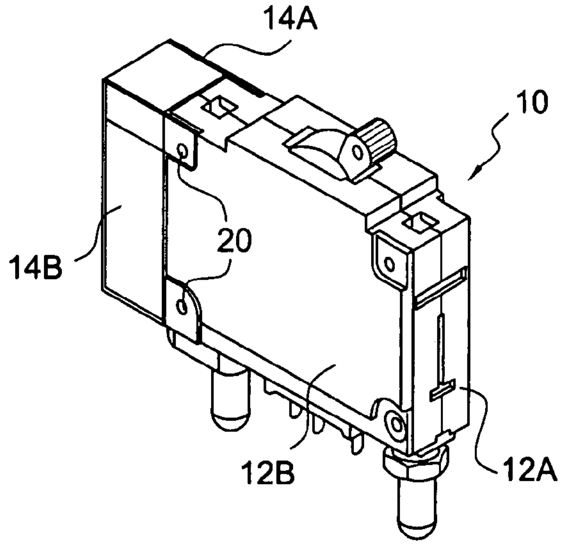
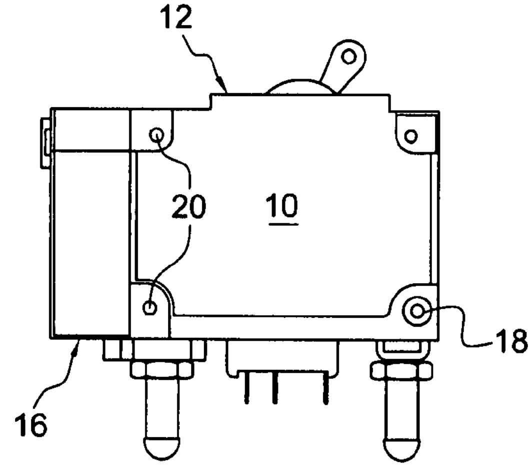
FIG. 1B
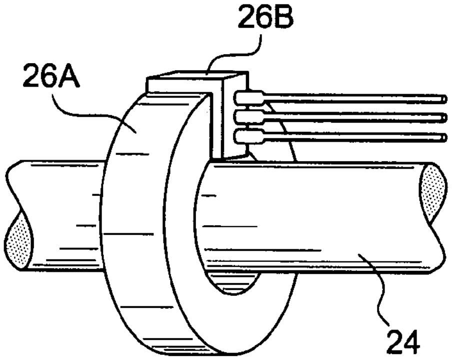
FIG. 5
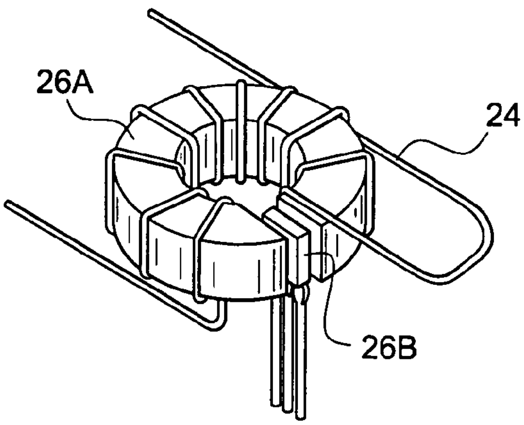
FIG. 6

APPARATUS COMPRISING CIRCUIT BREAKER WITH ADJUNCT SENSOR UNIT

CROSS-REFERENCE TO RELATED APPLICATION

This application claims the benefit of U.S. Provisional Application No. 60/654,074 filed Feb. 18, 2005, incorporated herein by reference.

BACKGROUND OF THE INVENTION

Power systems often include multiple circuit breakers used to protect and isolate individual branch circuits powered from a common buss. Such branch circuit breakers are used to protect equipment and wiring from the effects of overcurrent resulting from abnormal overload and short circuit conditions. In certain applications it is desirable or necessary to monitor the current of each branch circuit in order to determine the portion of total buss current drawn by each circuit.

Such current monitoring may be used to meter power consumption for billing purposes, preventive maintenance, load shedding or for other purposes. Power system designers often use off-the-shelf stand-alone current sensors in applications where current monitoring is required. These may take the form of current shunts, current transformers, Hall Effect sensors, or other varieties of variable sensors.

Stand-alone current sensors have certain disadvantages, including, for example, the complexity of additional wiring and the modification of standard circuit breakers to accommodate the current sensors.

BRIEF DESCRIPTION OF THE INVENTION

Apparatus of the present invention provides a simple, self-contained current sensor unit as an adjunct to a standard circuit breaker. Minimal modification of the circuit breaker is required to incorporate the current sensor unit, which, after manufacture, becomes an integral part of the circuit breaker. The user of the apparatus benefits from reduced wiring, decreased engineering time, higher accuracy, and matched current sensor and circuit breaker ratings. The integrated current sensor unit uses non-invasive inductive technology and is electrically isolated from the circuit breaker. This provides added flexibility and safety for the user.

In a preferred embodiment, the current sensor unit can be configured in a number of ways, ranging, for example, from a basic sensor unit to a sensor unit that has a variety of options to provide a user with desired selected functions according to need and cost constraints. A programming device is used to provide calibration and other adjustment functions on a manufacturing assembly line, reducing labor and inventory requirements. Individual sensor units can be adjusted to the required parameters without making changes to the physical circuitry, by simply programming the correct values at the time of product assembly. The standardized units avoid the need for component changes for calibration and other adjustment functions. By virtue of the fact that the sensor unit is self-contained, it can be designed as a compact attachment to a standard circuit breaker with minimal modification of the circuit breaker.

BRIEF DESCRIPTION OF THE DRAWINGS

The invention will be further described in conjunction with the accompanying drawings, which illustrate preferred (best mode) embodiments of the invention, and wherein:

FIGS. 1A, 1B, and 1C are, respectively, a top view, a side view, and a perspective view of a standard circuit breaker to which a current sensor unit has been attached in accordance with one embodiment of the invention;

FIG. 5 is a somewhat diagrammatic perspective view showing a main current carrying conductor routed through a toroid/Hall Effect device;

FIG. 6 is a somewhat diagrammatic perspective view showing a main current carrying conductor routed through a toroid/Hall Effect device multiple times;

DETAILED DESCRIPTION OF THE INVENTION

Figure 8A:
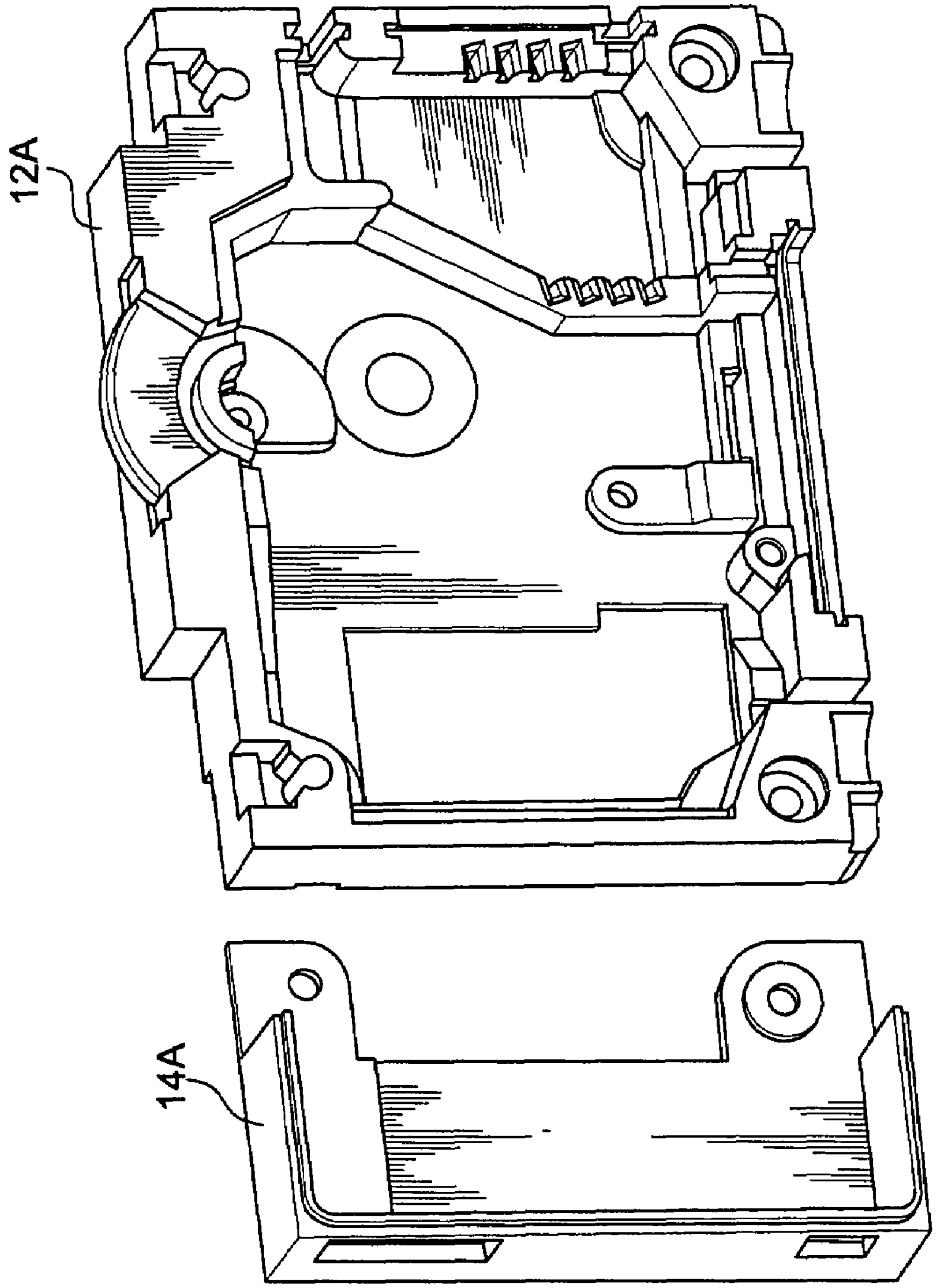
FIGS. 8A, 8B and 8C are perspective views of case variants that may be used in the invention.

FIGS. 1A, 1B, and 1C show a standard IEL (magnetic) circuit breaker 10 having a generally rectangular box-shape case 12 having opposite ends to one which the generally rectangular box-shape case 14 of a current sensor unit 16 is added as an attachment. In the form shown, the case of the circuit breaker is divided along a central plane and is constituted by two generally rectangular box portions 12A, 12B joined at the corners by fasteners such as rivets 18, for example. One of the box portions serves to hold essential parts of the circuit breaker, while the other box portion serves as a cover of the circuit breaker. The case 14 of the current sensor unit 16 may be similarly constructed. The case portions 14A, 14B are provided with legs 20 that overlap respective corners of the circuit breaker case 12 and that are joined to the. circuit breaker case by the same fasteners 18 that join the portions of the circuit breaker case. FIG. 8A shows a box portion 12A (e.g., half) of a circuit breaker case and a box portion 14A (e.g., half) of a current sensor unit case before attachment of the sensor unit case to the circuit breaker case. Other fastening devices (not shown) may be provided to assist in joining the portions of the case of the current sensor unit to one another.

Figure 2:
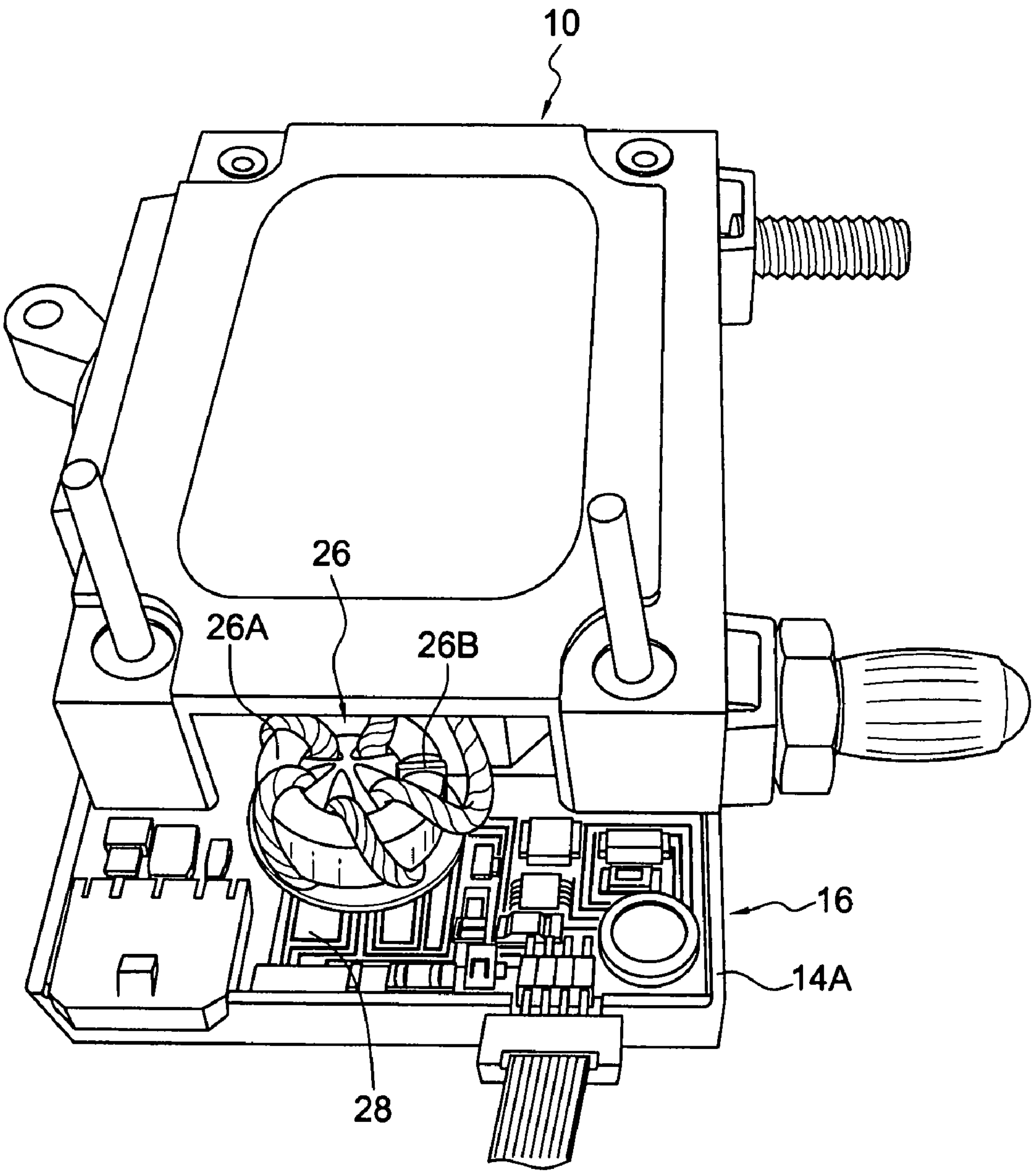
FIG. 2 is a perspective view of a standard circuit breaker with a current sensor unit attachment, a case of the current sensor unit being open to expose the interior of the unit.
Figure 3:
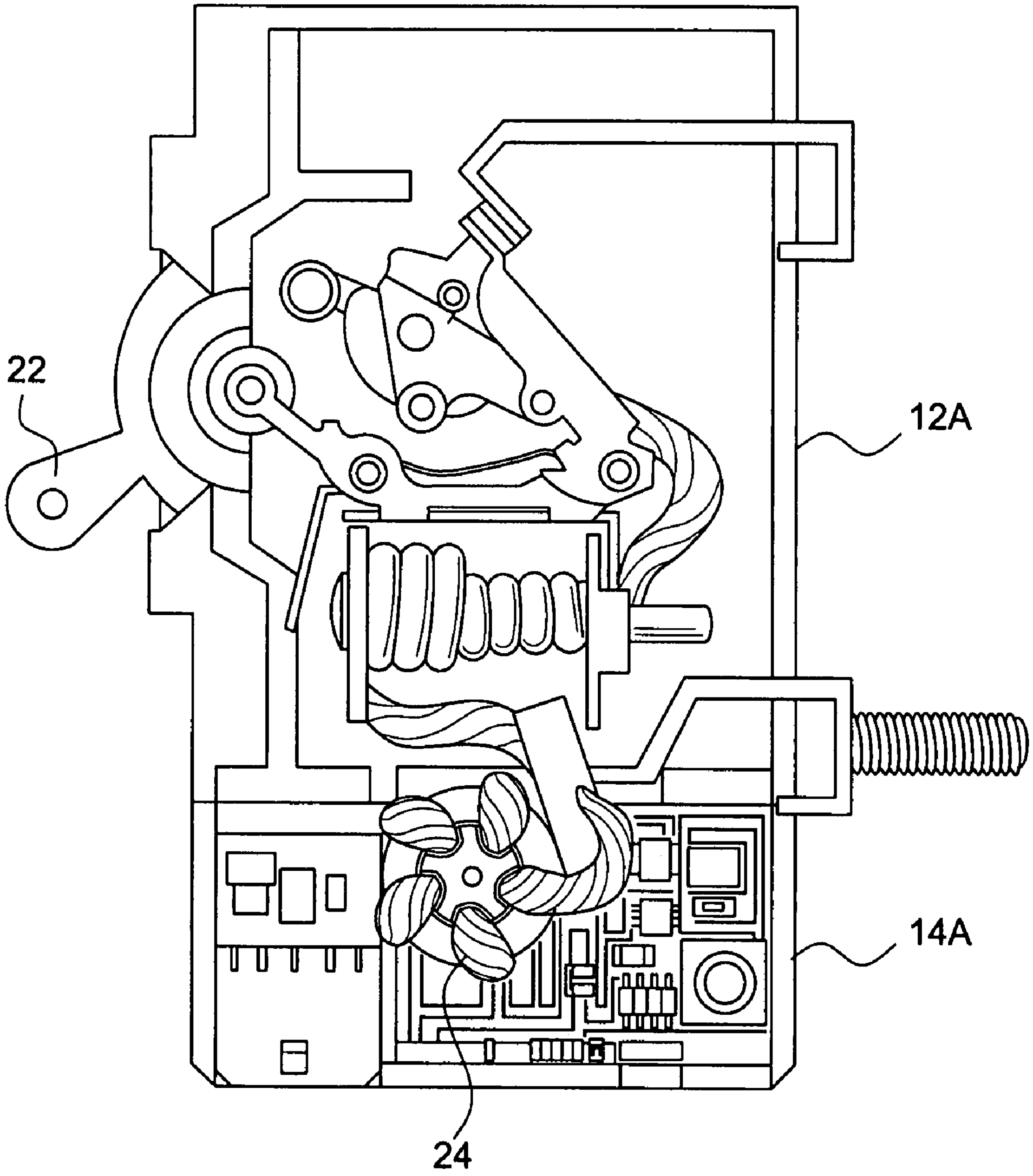
FIG. 3 is a plan view of a standard circuit breaker with a current sensor unit attachment of the invention, both the case of the circuit breaker and the case of the sensor unit being open to expose the interior of the circuit breaker and the current sensor unit (only parts of the circuit breaker being shown)

FIG. 2, shows a partially disassembled apparatus of the invention, in which one of the portions of the case of the current sensor unit (serving as a cover) has been removed to expose parts of the current sensor unit, the details of which will be described later. FIG. 3 shows a partially disassembled apparatus of the invention in which a portion of each case has been removed to show parts of the conventional circuit breaker and parts of the current sensor unit. Since the construction and operation of the conventional circuit breaker are well known, only a brief description will now be given.

The circuit breaker comprises a magnetic circuit and an electrical circuit and is essentially a toggle switching mechanism having a handle 22 (or other operating mechanism, e.g., rocker) that opens and closes the electrical circuit as the handle is moved to an "ON" or "OFF" position. The handle is connected to a contact bar by a collapsible link. When the link collapses, it allows contacts of the circuit breaker to fly open, thus breaking the electrical circuit. The magnetic circuit may comprise a frame, an armature, a delay core and a pole piece. The electrical circuit may comprise a terminal, a coil, a contact bar, contacts, and another terminal. As long as the current flowing through the circuit breaker remains below 100% of its rated trip current, the breaker will not trip, and the contacts will remain closed. Under these conditions, the electrical circuit can be opened and closed by moving the toggle handle. If the current is increased beyond the rated current by a predetermined amount, magnetic flux generated in the coil is sufficient to move the delay core against a spring to a position where it comes to rest against the pole piece. This increases the flux in the magnetic circuit, causing the armature to move from its normal position, triggering the collapsible link, and opening the contacts.

In accordance with a preferred embodiment of the invention, a main current carrying conductor 24 is routed through a toroid/Hall Effect device 26 that may be mounted on a circuit board 28. The toroid 26A serves as a flux concentrator of the magnetic field created by the current. The flux level may be magnified by passing the conductor through the toroid multiple times. In this way, very low currents may be accommodated. Multiple parallel conductors may be used with only a portion of them passing through the toroid. This method may be used to provide for measurement of very high currents.

Figure 4:
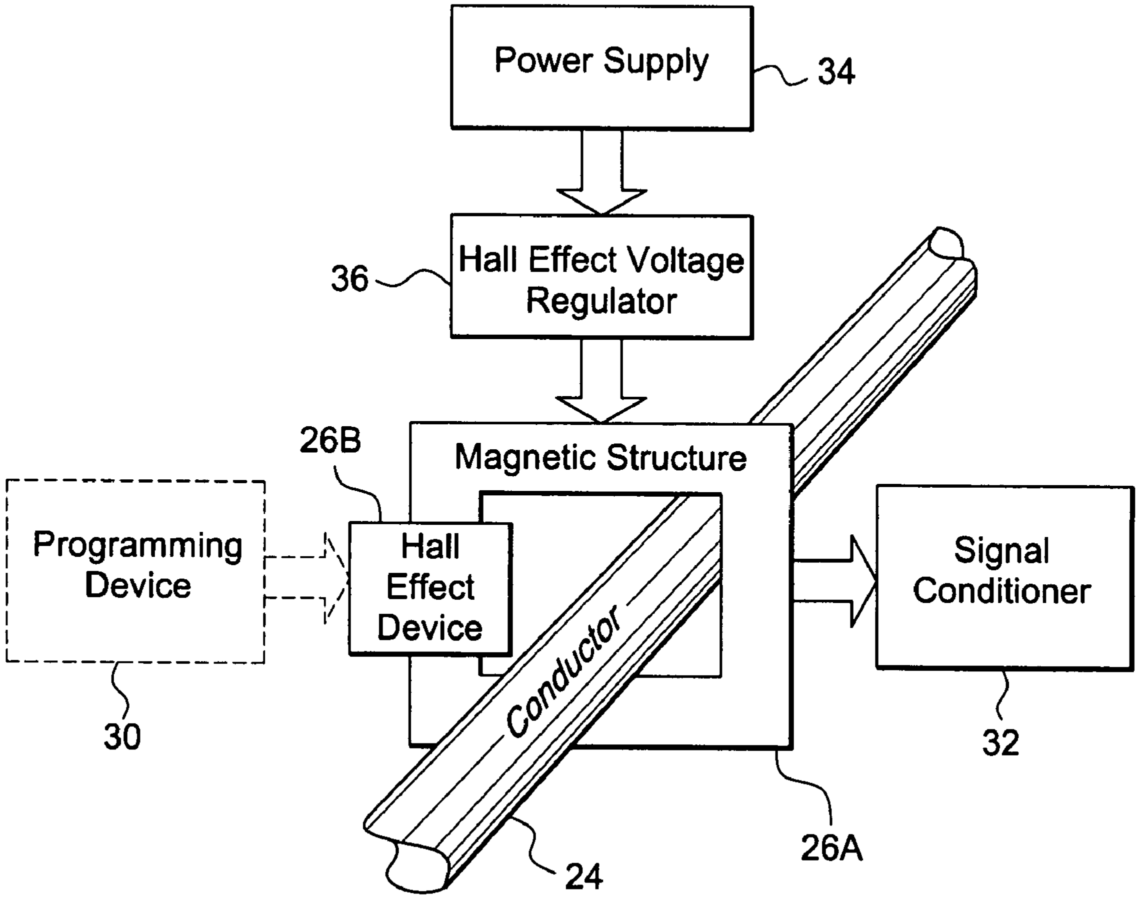
FIG. 4 is a block diagram showing one version of the current sensor unit and associated elements in accordance with the invention.

FIGS. 2 and 3 show the toroid 26A mounted on a circuit board 28 with a main current conductor 24 routed through the toroid multiple times. See also FIG. 6. FIGS. 4 and 5 show (diagrammatically) a single conductor routed through the toroid. The Hall Effect device 26B is mounted in a gap in the toroid, as shown in these figures.

Modification of a standard circuit breaker to incorporate a current sensor unit in accordance with the invention is simple. Mechanical modification involves attachment of the case of the current sensor unit to an end of the case of the circuit breaker, and providing opposed openings in the ends of the respective cases. Electrical modification involves re-routing a current-carrying conductor that normally connects a terminal of the circuit breaker to the coil of the circuit breaker, so that the conductor passes through the toroid (or other suitable magnetic concentrator) along its path from the terminal to the coil.

A simplified version of electrical and magnetic components of the invention will now be described with reference to FIG. 4, which shows six main components of the current sensor unit. A description of these components follows:

Hall Effect Device—This component is a programmable Hall Effect device 26B with capabilities for attaching a programming device (30) to adjust the range, offset, temperature compensation, linearity, filtering, and other input and output parameters of the sensor.

Magnetic Structure—This component is comprised of a magnetic yoke 26A (e.g., toroid) incorporating features for inserting and positioning the Hall Effect device 26B in the magnetic path, directing sufficient magnetic flux to the Hall Effect device, attaching the magnetic yoke to the sensor assembly, and electrically and thermally insulating the yoke. Versions of the invention intended for high current applications may not require the magnetic structure. In this case the Hall Effect device may simply be placed in the natural flux path of a current-carrying conductor 24. Other versions may use alternative magnetic structures instead of the toroid.

Signal Conditioner—This component (32) can be used to convert the raw output of the Hall Effect device into a form required by the end user. It can shift the level of the Hall Effect device signal and provide gain to increase or decrease the signal. It is also capable of providing increased current output. As shown on the schematic diagram of FIG. 7, it is represented by the Level Shifter, Primary Gain Stage, Secondary Gain Stage (and, optionally, the output stage). This component provides an enhancement of the current sensor and is not required for end users that can use the raw output signal from the Hall Effect device.

Power Supply—This component (34) is used to convert the power provided by an end user installation into the regulated voltage and current required by the circuitry of the current sensor unit. This component is not required for end user installations that provide sufficiently regulated power of the proper voltage and current. It is an enhancement that provides value in installations where power is available but incompatible with the requirements of the other sensor circuitry.

Hall Effect Voltage Regulator—This component (36) provides a stable voltage to the Hall Effect device so that its output is insensitive to power supply fluctuations. It provides enhanced accuracy for applications requiring non-ratiometric performance. Ratiometric performance means that the signal from the Hall Effect device will follow changes in the input voltage. This behavior is useful in certain applications and, in this invention, can be achieved by elimination of the Power Supply and Hall Effect Voltage Regulator sections. With these sections gone a percentage increase or decrease in the supply voltage to the Hall Effect device will result in an equal percentage increase or decrease in the output signal.

Programming Device—This component (30) is not a part of the current sensor unit but is a tool used to provide calibration and other adjustment functions on the assembly line. Using this tool to set up the current sensor unit reduces the labor and inventory required to manufacture the current sensor unit. Individual sensors can be adjusted to the required parameters without making changes to the physical circuitry but by simply programming the correct values at the time of product assembly.

Figure 7:
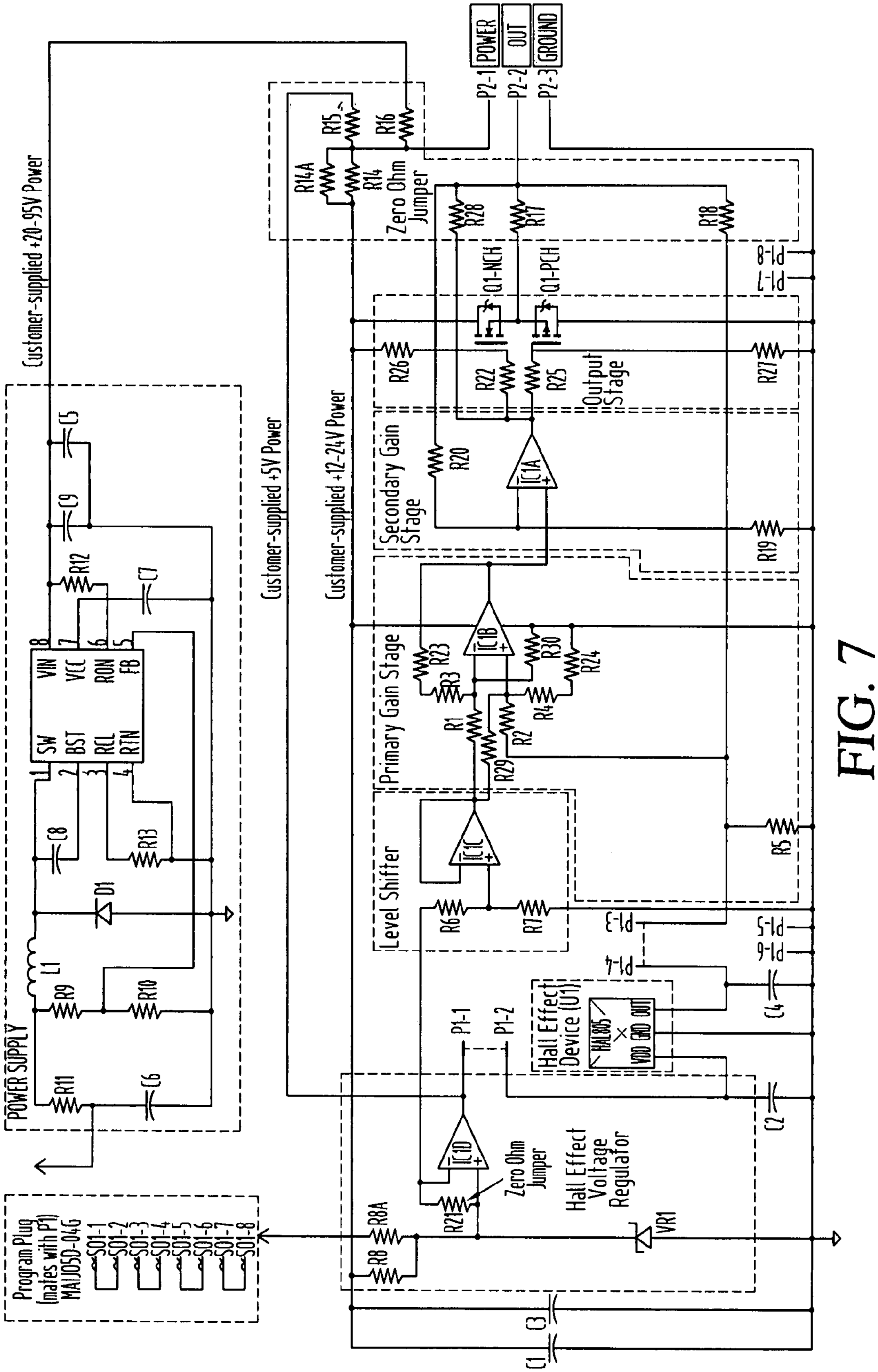
FIG. 7 is a schematic diagram showing circuitry used in an embodiment of the invention.

Following is a more detailed description of the electronic circuitry of an actual embodiment organized by functional sections, referring to the schematic diagram in FIG. 7 and components listed in the accompanying Table 3.

1. Hall Effect Device

The Hall Effect device is used to detect the magnetic field created by a current carrying conductor. To better capture the magnetic field and reduce the effects of spatial variations a magnetic yoke composed of a magnetically permeable material and formed in a shape conducive to concentration of the magnetic field is used. The Hall Effect device is inserted into a gap that interrupts the otherwise continuous torus of magnetic material. In this way, the magnetic field of any conductor extending through the center of the magnetic structure will be induced into the magnetic material. With the insertion of the Hall Effect device in the gap, the magnetic circuit can only be completed by directing the induced magnetic field through the gap and thus through the device.

The Hall Effect device is a 3 pin programmable integrated circuit (e.g., Micronas part no. HAL805) containing analog and digital circuitry as well as memory. Upon receipt, input signals are converted into digital format. All signal processing is thereafter performed digitally. After processing, the digital signal is converted to an analog signal available at the output. This processing method greatly reduces the effects of temperature drift, analog offsets, and mechanical stress that result in output error. Programming is accomplished by modulating the supply voltage. The device is designed for use in hostile environmental conditions and has an operating temperature range of −40°-150° C.

The programmable options include range, span, output voltage, frequency response and temperature compensation. Programming for a 0.5-4.5 volt output range provides the maximum sensitivity and represents the standard output span used. Programming tools may include PC based computer applications provided by the manufacturer of the Hall Effect device and applicable software.

Programming the current range of the sensor is accomplished by connecting the calibration test equipment to P1 and performing the calibration sequence. In FIG. 2 a ribbon cable used in programming is shown connected to P1 through a wall of the case of the current sensor unit. The calibration software applies minimum and maximum current values to the sensor and calculates the parameters necessary to adjust the Hall Effect device for the proper output, then loads the correct values into the Hall Effect device registers and locks the memory so that it cannot be changed. After calibration, the test equipment is disconnected and a program plug is inserted into PI and sealed to prevent removal.

In order to form a magnetic circuit of suitable intensity, it is necessary at lower currents to amplify the effective magnetic field by passing the conductor through the center of the toroid multiple times, thus increasing the number of ampere-turns (eg.: 5 amperes and 5 passes through the toroid=25 ampere turns). The minimum sensitivity of the Hall Effect device dictates a minimum number of ampere-turns that will provide acceptable accuracy.

2. Hall Effect Voltage Regulator

The Hall Effect device exhibits ratiometric behavior. That is, any change in supply voltage will be reflected by a proportional change in output level. Obtaining good accuracy therefore depends greatly on the accuracy and stability of the power supply serving the Hall Effect device. For this reason the supply used to power the Hall Effect device is designed for high accuracy and stability. An LM4050AEM3-5.0 micropower voltage reference supplies 5.0 volts to a ¼ LM124 op amp configured as a X 1 voltage follower. Both devices exhibit high stability over the full −40°-125° C. temperature range. Accuracy of this circuit is ±0.1% over the full range.

3. Power Supply

The power supply section comprises a wide input tolerance switching power supply that provides 12 volt power to the other current sensor circuitry. Any DC voltage between 20 and 95 Volts may be used to power the current sensor. The power supply is based upon the National Semiconductor LM5008 High Voltage Step Down Switching Regulator.

4. Level Shifter

The level shifter combines with sections 5, 6, and 7 to form the signal conditioning circuitry for the current sensor. This section is a X1 voltage follower that buffers the voltage set by the divider formed from R6 and R7. The resulting voltage is used to provide a non-zero reference for the primary gain stage that will cause its output voltage to be shifted. For example, if the minimum voltage out of the Hall Effect device is 0.5V and that represents 0 amperes current, then setting the output of the divider at 0.5V will cause the output of the primary gain stage to be shifted down by 0.5 volts to a level of zero volts when zero current is applied. R6 and R7 have a resistance tolerance of 0.1% and a temperature coefficient of 25 ppm The output of the level shifter is represented by the following formula:

$$V_{OUT} = 5 \times \frac{R7}{R6 + R7}$$

5. Primary Gain

The primary gain stage is a combination difference and summing amplifier used to provide amplification of the signal from the Hall Effect device. The series combinations of R3-R23 and R4-R24 allow precise values of resistance to be created from standard resistors. The output voltage is described by the following formulae:

A) With R29 and R30 uninstalled $$V_{out} = \left(\frac{R1 + R3 + R23}{R2 + R4 + R24}\right)\frac{R4 + R24}{R1}V_{R2} - \frac{R3 + R23}{R1}V_{R1}$$

B) With R29 and R30 uninstalled and R1=R2 and R3+R23=R4+R24

$$V_{out} = \frac{R3 + R23}{R1}(V_{R2} - V_{R1})$$

C) With R1 uninstalled and R29=R2

$$V_{out} = \left(\frac{R30 + R3 + R23}{R2 + R4 + R24}\right)\frac{R4 + R24}{R30}(V_{R2} + V_{R29}) - \frac{R3 + R23}{R30}V_{R1}$$

As an example, suppose R29 and R30 are uninstalled, R3 is 249K, R23 is 1K, R4 is 249K, R24 is 1K, R1 is 200K, and R2 is 200K. For an input ranging from 0.5 to 4.5 volts at R2 and an input (as described previously) of 0.5V at R1, the amplifier will yield a range from 0.0 to 5.0 Volts. All resistors must be 0.1% and 25 ppm in order to keep overall error at less than 1%.

6. Secondary Gain Stage

The secondary gain stage is used to buffer the output of the primary gain stage, and provide any additional amplification required. As an example, it might be used to amplify the 0-5 Volt output described previously by 2 times for an output of 0-10 Volts. For this stage:

$$V_{out} = \frac{R19 + R20}{R19}(V_{in})$$

7. Output Stage

The output stage is an optional feature of the signal conditioning circuitry. It is constructed from a complementary Mosfet pair connected in push-pull fashion and a suitable biasing resistor network This arrangement provides two advantages where needed. First, it is capable of sourcing high currents and second, it is capable of making voltage excursions extremely close to the power supply rail.

Operation close to the rail is important for accuracy when signals are small. Implementing a 0-1 volt output requires that the zero value at the output be less than 10 milliamps to be within 1% accuracy. For a 0.0-100 millivolt output a zero value of less than 1 millivolt is required. Operational amplifiers cannot achieve such performance. So, even when high output current is not required, it will be necessary to use the output stage if operation near zero volts is required.

Electronic Assembly Options

There are several options that are achieved by the inclusion or exclusion of certain functional sections, and by the installation of correct zero ohm jumpers. The production PC board is arranged in such a way that sections may be populated or left empty to achieve the desired functionality. Following is a description of the product options.

TABLE 1

| Rated Supply Voltage | Signal Conditioning | High Output Current |
|---|---|---|
| 5 V Ratiometric | | |
| 12 Volt ± 10% | | |
| 11-30 V | X | |
| 20-95 V | | |
| 20-95 V | X | |
| 20-95 V | X | X |

Any of the signal conditioned options also have a choice of output voltage ranges. See below for examples.

TABLE 2

| Signal Conditioned Output Voltage | R1 Ω | R2 Ω | R3 Ω | R4 Ω | R23 Ω | R24 Ω | R6 Ω | R7 Ω | R19 Ω | R20 Ω | R29 Ω | R30 Ω |
|---|---|---|---|---|---|---|---|---|---|---|---|---|
| 0-1 | 200K | 200K | 49.9K | 49.9K | 100 | 100 | 18K | 2K | None | 0 | None | None |
| 0-5 | 200K | 200K | 249K | 249K | 1K | 1K | 18K | 2K | None | 0 | None | None |
| 0-10 | 200K | 200K | 249K | 249K | 1K | 1K | 18K | 2K | 100K | 100K | None | None |
| 1-5 | None | 200K | 200K | 200K | 0 | 0 | 18K | 2K | None | 0 | 200K | 200K |

Note:
All Resistors are 0.1% 1/16 W 25 ppm similar to Susumu RR0816P-XXXX-B-T5

TABLE 3

| Part | Value | Component Type | Description | Temperature (° C.) | Supplier |
|---|---|---|---|---|---|
| C1 | .1 uF | Capacitor | .1 μF 50 V | −55 to 125 | Kemet C1206C104M5RACTU |
| C2 | .01 uF | Capacitor | .01 μF 50 V | −55 to 125 | AVX 12065C103KAT2A |
| C3 | 6.8 uF | Capacitor | 6.8 μF 35 V | −55 to 125 | Panasonic EEJ-LIVC685R |
| C4 | .01 uF | Capacitor | .01 μF 50 V | −55 to 125 | Kemet C1206C104M5RACTU |
| C5 | 1 uF | Capacitor | 1 μF 100 V | −55 to 125 | TDK C4532X7R2A105M |
| C6 | 22 uF | Capacitor | 22 uF 25 V | −55 to 125 | TDK C4532X7R1E226M |
| C7 | .1 uF | Capacitor | .1 μF 50 V | −55 to 125 | Kemet C1206C104M5RACTU |
| C8 | .01 uF | Capacitor | .01 μF 50 V | −55 to 125 | AVX 12065C103KAT2A |
| C9 | .1 uF | Capacitor | .1 μF 100 V | −55 to 125 | TDK C3216X7R2A104M |
| D1 | 110T3 | Diode | MURA110T3 | −55 to 125 | On Semiconductor |
| IC1 | 2D | Op Amp IC | LM124D | −55 to 125 | Texas Instruments Only |
| IC2 | 8 MM | Voltage Regulator IC | LM5008 | −55 to 125 | National Semiconductor |
| Q1 | 9 | Dual Comp MosFet | IRF7309 | −55 to 125 | International Rectifier IRF7309 |
| J1 | | Connector | 8 position right angle header | −55 to 125 | Samtec FTSH-104-04-L-D-RA |
| L1 | 2 | Inductor | 470 μH .2 A 2 Ohm | −55 to 125 | SLF7032 |
| P1 | 104-04- | Connector | 3 Pin Plug | | Molex 43650-0303 |
| R1 | 200K | Resistor | 200K OHM 1/16 W .1% 0603 SMD | −55 to 125 | Susumu RR0816P-204-B-T5 |
| R2 | 200K | Resistor | 200K OHM 1/16 W .1% 0603 SMD | −55 to 125 | Susumu RR0816P-204-B-T6 |
| R3 | 249K | Resistor | 249K OHM 1/16 W .1% 0603 SMD | −55 to 125 | Susumu RR0816P-2493-B-T5-39D |
| R4 | 249K | Resistor | 249K OHM 1/16 W .1% 0603 SMD | −55 to 125 | Susumu RR0816P-2493-B-T5-39D |
| R5 | 4.7K | Resistor | 4.70K OHM 1/8 W 1% SMD 0805 | −55 to 125 | Yageo 9T08052A4701FBHFT |
| R6 | 18K | Resistor | 18.0K OHM 1/8 W .1% SMD 0805 | −55 to 125 | Yageo 9T08052A1802BBHFT |
| R7 | 2K | Resistor | 2.00K OHM 1/8 W .1% SMD 0805 | −55 to 125 | Yageo 9T08052A2001BBHFT |
| R8 | Install | Resistor | As at right 1/8 W 1% SMD 0805 | −55 to 125 | Yageo 9T08052A4701FBHFT |
| R9 | 3.83K | Resistor | 3.83K OHM 1/8 W .1% SMD 1206 | −55 to 125 | Yageo 9T12062A3831BBHFT |
| R10 | 1.0K | Resistor | 1K OHM 1/8 W 1% 1206 SMD | −55 to 125 | Panasonic ERJ-8ENF1001V |
| R11 | 2 | Resistor | 2 OHM 1/4 W 5% 1206 SMD | −55 to 125 | Panasonic ERJ-8GEYJ2R0V |
| R12 | 357K | Resistor | 357K OHM 1/8 W 1% 1206 SMD | −55 to 125 | Panasonic ERJ-8ENF3573V |
| R13 | 267K | Resistor | 267K OHM 1/8 W 1% 1206 SMD | −55 to 125 | Panasonic ERJ-8ENF2673V |
| R14 | Install | Resistor | As at right 1/10 W 5% 0603 SMD | −55 to 125 | Yageo 9C06031A0R00JLHFT |
| R15 | 0 | Resistor | 0.0 OHM 1/10 W 5% 0603 SMD | −55 to 125 | Yageo 9C06031A0R00JLHFT |
| R16 | 0 | Resistor | 0.0 OHM 1/10 W 5% 0603 SMD | −55 to 125 | Yageo 9C06031A0R00JLHFT |
| R17 | 0 | Resistor | 0.0 OHM 1/10 W 5% 0603 SMD | −55 to 125 | Yageo 9C06031A0R00JLHFT |
| R18 | 0 | Resistor | 0.0 OHM 1/10 W 5% 0603 SMD | −55 to 125 | Yageo 9C06031A0R00JLHFT |
| R19 | 1010M | Resistor | 30.0K OHM 1/16 W .1% 0603 SMD | −55 to 125 | Susumu RR0816P-303-B-T5 |
| R20 | 0 | Resistor | 0.0 OHM 1/10 W 5% 0603 SMD | −55 to 125 | Yageo 9C06031A0R00JLHFT |
| R21 | 0 | Resistor | 0.0 OHM 1/10 W 5% 0603 SMD | −55 to 125 | Yageo 9C06031A0R00JLHFT |
| R22 | 560 | Resistor | 560 OHM 1/8 W 1% 0805 SMD | −55 to 125 | Yageo 9T08052A5600FBHFT |
| R23 | 1K | Resistor | 1.0K OHM 1/16 W .1% 0603 SMD | −55 to 125 | Susumu RR0816P-102-B-T5 |

TABLE 3-continued

| | | | | | |
|---|---|---|---|---|---|
| R24 | 1K | Resistor | 1.0K OHM 1/16 W .1% 0603 SMD | −55 to 125 | Susumu RR0816P-102-B-T5 |
| R25 | 560 | Resistor | 560 OHM 1/8 W 1% SMD 0805 | −55 to 125 | Yageo 9T08052A5600FBHFT |
| R26 | 10k | Resistor | 10.0K OHM 1/8 W 1% 0805 SMD | −55 to 125 | Yageo 9C08052A1002FKHFT |
| R27 | 10k | Resistor | 10.0K OHM 1/8 W 1% 0805 SMD | −55 to 125 | Yageo 9C08052A1002FKHFT |
| R28 | 0 | Resistor | 0.0 OHM 1/10 W 5% 0603 SMD | −55 to 125 | Yageo 9C06031A0R00JLHFT |
| R29 | | Resistor | | −55 to 125 | Panasonic ERJ-1TYJ681U |
| R30 | | Resistor | | −55 to 125 | Panasonic ERJ-1TYJ681U |
| U1 | 5 | | Programmable Hall Device | −55 to 150 | Micronas HAL805 |
| VR1 | 0 | | Micropower Shunt Voltage Reference | −55 to 125 | National LM4050AEM3-5.0 |
| SO1 | 0 | Shunt Jumper | 4 Pos Shunt Jumper Program Plug | −55 to 125 | Comm Con MAIJ050-04G |

| | INSTALL | | | | | |
|---|---|---|---|---|---|---|
| Part | 5 V not Signal Conditioned | 12 Volt ± 10% not Signal Conditioned | 11-30 V Signal Conditioned | 20-95 V not Signal Conditioned | 20-95 V Signal Conditioned | 20-95 V Signal Conditioned High Output Current |
| C1 | X | X | X | X | X | X |
| C2 | X | X | X | X | X | X |
| C3 | | | X | | | |
| C4 | X | X | X | X | X | X |
| C5 | | | | X | X | X |
| C6 | X | X | | X | X | X |
| C7 | | | | X | X | X |
| C8 | | | | X | X | X |
| C9 | | | | X | X | X |
| D1 | | | | X | X | X |
| IC1 | | | X | | X | X |
| IC2 | | | | X | X | X |
| Q1 | | | | | | X |
| J1 | X | X | X | X | X | X |
| L1 | | | | X | X | X |
| P1 | X | X | X | X | X | X |
| R1 | | | X | | X | X |
| R2 | | | X | | X | X |
| R3 | | | X | | X | X |
| R4 | | | X | | X | X |
| R5 | | | X | | X | X |
| R6 | | | X | | X | X |
| R7 | | | X | | X | X |
| R8 | 4.7k Ohms | 540 Ohms | 4.7k Ohms | 680 Ohms | 4.7K Ohms | 4.7K Ohms |
| R9 | | | | X | X | X |
| R10 | | | | X | X | X |
| R11 | | | | X | X | X |
| R12 | | | | X | X | X |
| R13 | | | | X | X | X |
| R14 | 0 Ohms | 540 Ohms | 0 Ohms | | | |
| R15 | X | | | | | |
| R16 | | | | X | X | X |
| R17 | | | | | | X |
| R18 | X | | | X | | |
| R19 | | | | | X | X |
| R20 | | | X | | X | X |
| R21 | | X | | | | |
| R22 | | | | | | X |
| R23 | | | X | | X | X |
| R24 | | | X | | X | X |
| R25 | | | | | | X |
| R26 | | | | | | X |
| R27 | | | | | | X |
| R28 | | | X | | X | X |
| R29 | | | | | | |
| R30 | | | | | | |
| U1 | X | X | X | X | X | X |
| VR1 | | X | X | X | X | X |
| SO1 | X | X | X | X | X | X |

Figure 8B:
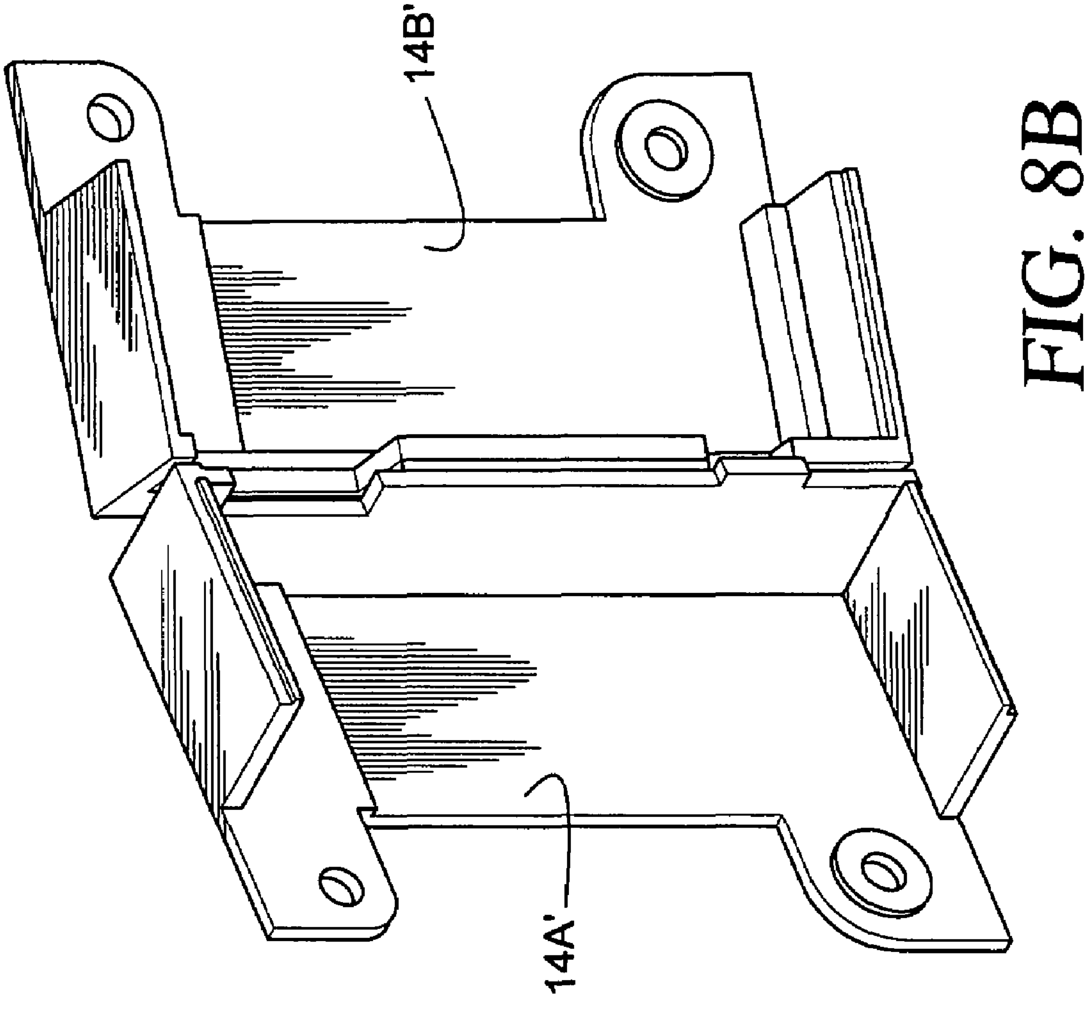
Figure 8C:
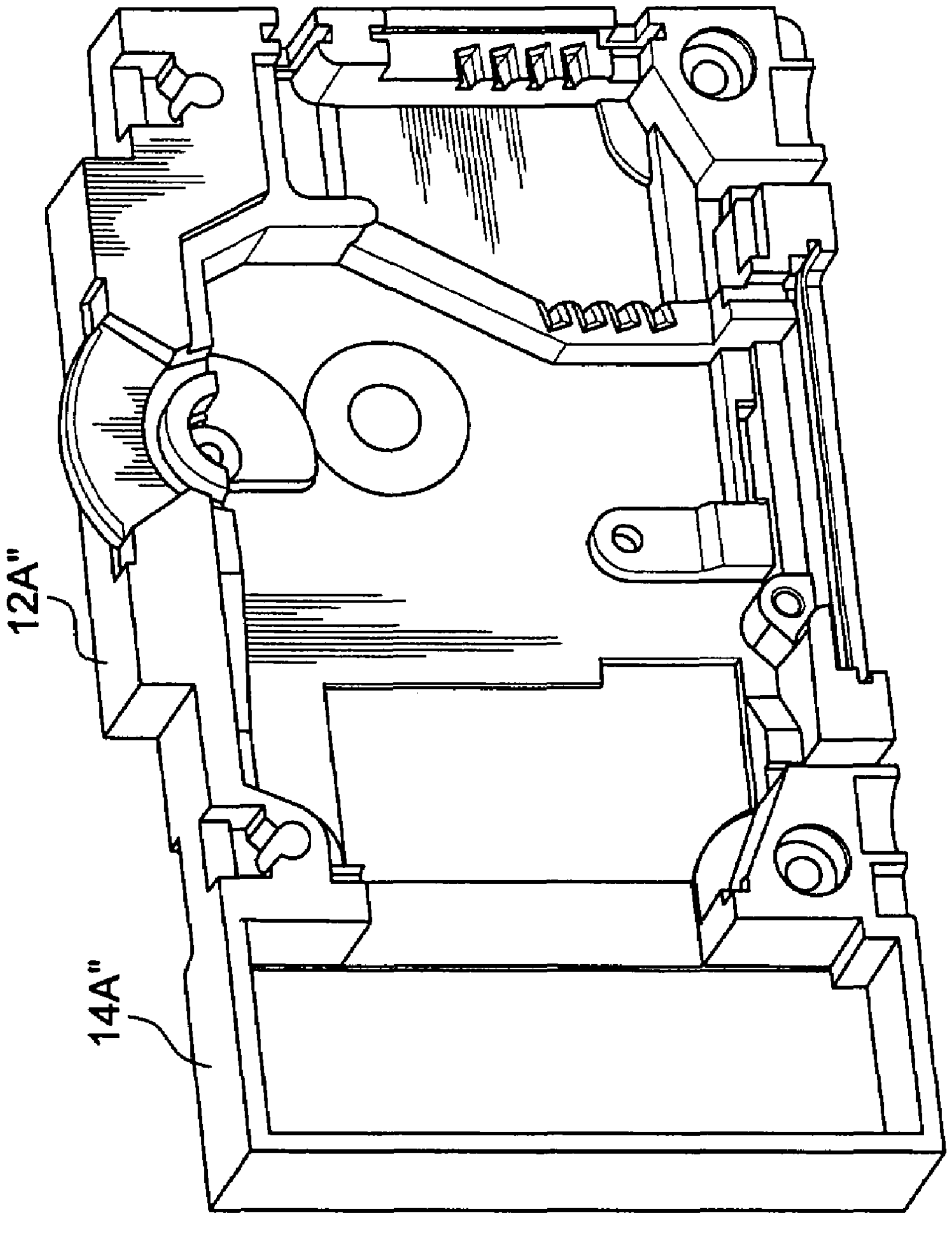

Note:
For signal conditioned assemblies 0-5 Volt Output is shown. See Table at right for R6, R7, R19 and R20 values with alternate output voltages/GD The construction of the case of the current sensor unit can be modified from that shown in FIG. 8A. FIG. 8B shows an embodiment in which box portions 14A', 14B' of the case of the sensor unit case are hinged to one another.

As stated earlier, one of the advantages of the invention is that a current sensor unit can be constructed as an adjunct to a standard circuit breaker with minimal modification of the circuit breaker. However, there may be instances in which it is desirable to incorporate a current sensor unit of the invention in a case of a circuit breaker that has been specifically designed to receive the current sensor unit. FIG. BC shows an embodiment in which box portions of the current sensor unit case are integrally molded with corresponding box portions of the circuit breaker case. See, e.g., 14A", 12A".

Figure 9:
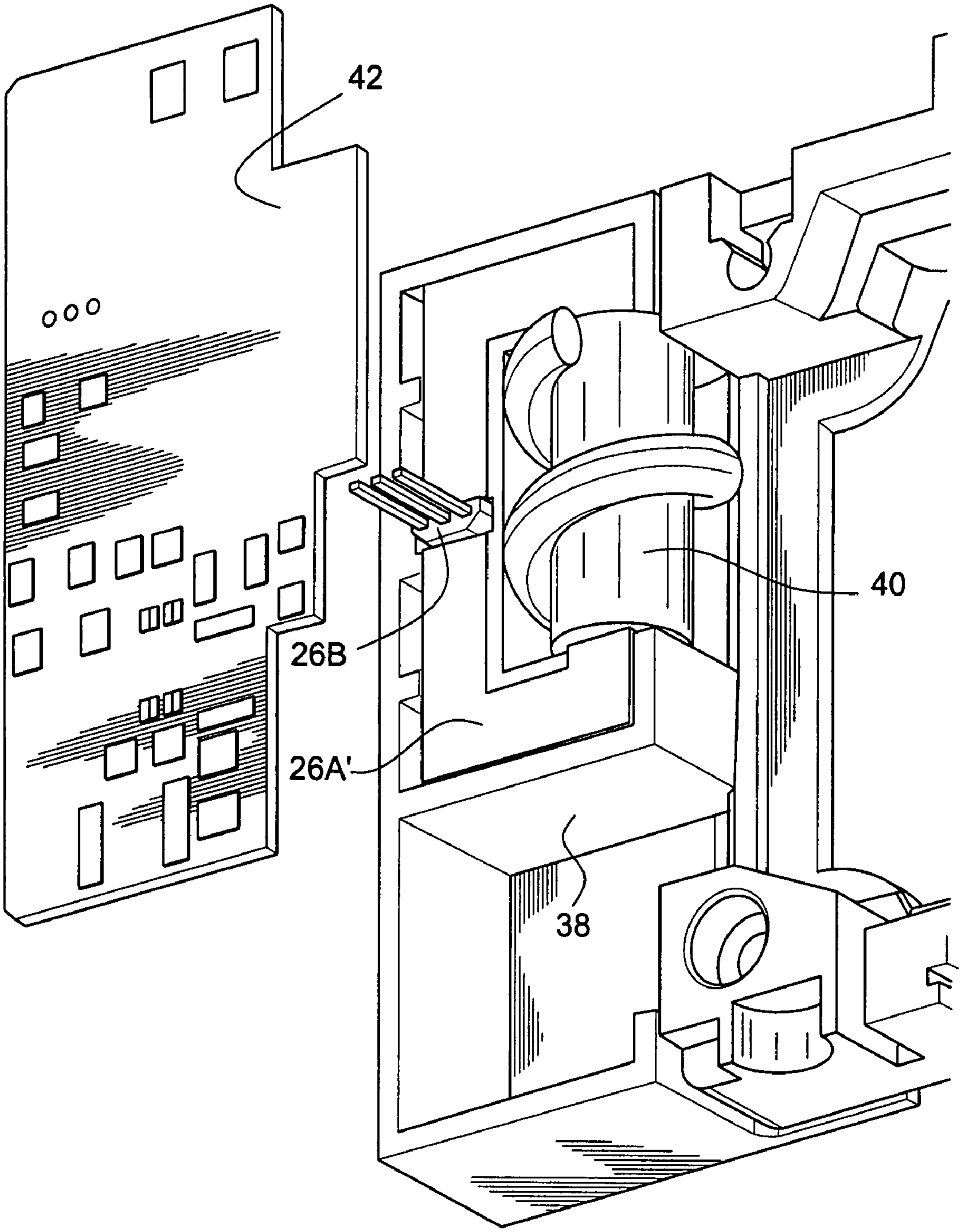
FIG. 9 is an exploded truncated perspective view showing another embodiment of the invention.

FIG. 9 shows another embodiment of the invention using a different magnetic concentrator 26A'. In this embodiment the magnetic concentrator is supported in a holder 38 molded as part of one case portion 14A''' of the current sensor. The magnetic concentrator is a rectangular annulus and may be comprised of a stack of laminates made of Mu metal or ferrite material, for example. A leg of the magnetic concentrator 26A' extends into a plastic sleeve 40. The leg has opposed parts that meet at the center of the sleeve with an insignificant gap. A current carrying conductor 24 from the circuit breaker is wound around the plastic sleeve. A Hall Effect sensor 26B is mounted in a gap in the magnetic concentrator. A circuit board 42 is placed over the magnetic structure.

While preferred embodiments of the invention have been shown and described, changes can be made without departing from the principles and spirit of the invention, the scope of which is defined in the claims which follow. For Example, the sensor unit can be programmed to measure voltage. AC or DC current or a combination thereof can be sensed, for example. Moreover, some of the principles of the invention can be used to provide self-contained adjuncts to other types of current-carrying electrical devices.

What is claimed is:

1. Apparatus comprising:

a circuit breaker including a switching mechanism in a box-shape case having opposite ends; and a current sensor unit including a current sensor self-contained in an additional box-shape case, wherein the case of the current sensor unit is connected with one end of the case of the circuit breaker, wherein a flexible current carrying conductor of the circuit breaker is routed from the case of the circuit breaker into the additional case so as to pass through the current sensor unit, wherein the current sensor unit has an integral annular magnetic core located entirely in the additional case and mounted to a circuit board in the additional case, wherein the flexible conductor is wound about a portion of the magnetic core, wherein the circuit breaker has an overcurrent-responsive tripping device connected in a main current carrying circuit extending between terminals external to a side of the circuit breaker case, and wherein the current sensor unit includes electronic circuitry with an output terminal that is devoid of connection to the tripping device and that provides an output signal related to the current carried by the flexible current carrying conductor.

2. Apparatus according to claim 1, wherein the magnetic core comprises a torodial core through which the conductor passes.

3. Apparatus according to claim 1, wherein the magnetic core has a gap containing a Hall Effect device.

4. Apparatus according to claim 3, wherein the Hall Effect device is programmable and has a programming connector.

5. Apparatus according to claim 3, wherein the current sensor unit includes at least one of a Hall Effect regulator, a power supply, and a Hall Effect output signal conditioner.

6. Apparatus according to claim 3, wherein the current sensor unit has a Hall Effect output signal conditioner including a level shifter and at least one gain stage.

7. Apparatus according to claim 3, wherein the current sensor unit has a Hall Effect output signal conditioner including a level shifter, a primary gain stage, a secondary gain stage, and an output stage.

8. Apparatus according to claim 1, wherein the current sensor unit communicates with the circuit breaker through opposed openings in the respective cases.

9. Apparatus according to claim 1, wherein each case is comprised of box portions connected together by fasteners.

10. Apparatus according to claim 1, wherein the case of the current sensor unit comprises two box portions that are hinged to one another.

11. An apparatus according to claim 1, wherein the case of the current sensor unit and the case of the circuit breaker are formed as two integrally molded box portions that are connected by fasteners.

12. An Apparatus according to claim 1, wherein the magnetic core is mounted in a support integral with a case portion of the current sensor unit.

13. An apparatus according to claim 12, wherein the magnetic core comprises a rectangular annulus with a leg extending through a sleeve on which the current carrying conductor is wound.

14. An apparatus according to claim 1, wherein each box-shape case is generally rectangular.

* * * * *